United States Patent
Kazmi et al.

(10) Patent No.: US 9,814,019 B2
(45) Date of Patent: Nov. 7, 2017

(54) METHODS AND SYSTEMS FOR CONFIGURING OVERLAPPING MBMS CONFIGURATIONS ON MULTIPLE CARRIERS

(71) Applicant: TELEFONAKTIEBOLAGET L M ERICSSON (PUBL), Stockholm (SE)

(72) Inventors: Muhammad Kazmi, Bromma (SE); Iana Siomina, Täby (SE); Håkan Persson, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/441,342

(22) PCT Filed: Dec. 17, 2014

(86) PCT No.: PCT/IB2014/067046
§ 371 (c)(1),
(2) Date: May 7, 2015

(87) PCT Pub. No.: WO2015/140611
PCT Pub. Date: Sep. 24, 2015

(65) Prior Publication Data
US 2016/0261394 A1  Sep. 8, 2016

Related U.S. Application Data

(60) Provisional application No. 61/968,642, filed on Mar. 21, 2014.

(51) Int. Cl.
*H04W 72/00* (2009.01)
*H04W 4/06* (2009.01)
*H04L 5/00* (2006.01)

(52) U.S. Cl.
CPC ......... *H04W 72/005* (2013.01); *H04L 5/0005* (2013.01); *H04L 5/0044* (2013.01);
(Continued)

(58) Field of Classification Search
CPC .... H04W 4/06; H04W 72/005; H04W 76/002
See application file for complete search history.

(56) References Cited

U.S. PATENT DOCUMENTS

2010/0317283 A1* 12/2010 Wu ............... H04W 72/005
455/3.06
2011/0222477 A1* 9/2011 Wu ............... H04L 12/1845
370/328

(Continued)

FOREIGN PATENT DOCUMENTS

WO  2013029251 A1  3/2013
WO  2013074458 A1  5/2013

OTHER PUBLICATIONS

QUALCOMM Inc.; "eMBMS reception on configurable SCell;" 3GPP Draft; R2-140086; 3rd Generation Partnership Project (3GPP); Prague, Czech Republic; Feb. 9, 2014.
(Continued)

*Primary Examiner* — Marcus R Smith

(57) ABSTRACT

Embodiments described herein provide methods and systems for enabling MBMS transmission in at least one MBMSFN area. The method can include determining a first MBMS configuration comprising at least a first MBSFN subframe configuration for MBMS transmission on a first carrier frequency, and a second configuration comprising of at least a second blank or partly blank subframe configuration on a second carrier frequency, wherein at least one first MBSFN subframe at least partly overlaps in time with at least one second subframe. The method can further include configuring a second network node with the first MBMS configuration for MBMS signal transmission on the first (Continued)

carrier frequency. The method can further include configuring a third network node with the second configuration on the second carrier frequency.

18 Claims, 5 Drawing Sheets

(52) U.S. Cl.
CPC .......... *H04L 5/0058* (2013.01); *H04L 5/0092* (2013.01); *H04W 4/06* (2013.01); *H04L 5/001* (2013.01); *H04L 5/0032* (2013.01)

(56) References Cited

U.S. PATENT DOCUMENTS

| | | | |
|---|---|---|---|
| 2011/0243056 A1 | 10/2011 | Jen | |
| 2012/0213130 A1 | 8/2012 | Zhang | |
| 2013/0155936 A1* | 6/2013 | Deng | H04W 72/005 370/312 |
| 2014/0126457 A1* | 5/2014 | Gou | H04L 12/189 370/312 |
| 2015/0124682 A1* | 5/2015 | Phan | H04W 4/06 370/312 |
| 2016/0065338 A1* | 3/2016 | Kim | H04L 5/005 370/330 |

OTHER PUBLICATIONS

Nsn, et al.; "Service Indication and Ping Pong Avoidance;" 3GPP Draft; R2-140048 SAI Issue; 3rd Generation Partnership Project (3GPP); Prague, Czech Republic; Feb. 9, 2014.

\* cited by examiner

METHODS AND SYSTEMS FOR CONFIGURING OVERLAPPING MBMS CONFIGURATIONS ON MULTIPLE CARRIERS

CROSS-REFERENCE TO RELATED APPLICATIONS

This application is a 371 of PCT/IB2014/067046, filed Dec. 17, 2014, which claims the benefit of U.S. Provisional Patent Application No. 61/968,642, filed Mar. 21, 2014, entitled "Methods and Systems for Configuring Overlapping MBMS Configurations on Multiple Carriers," the disclosures of which are fully incorporated herein by reference.

FIELD

Embodiments of the invention relate to the field of wireless communication; and more specifically, to configuring overlapping multimedia broadcast multicast service (MBMS) configurations on multiple carriers in a wireless communication system.

BACKGROUND

Multimedia Broadcast Multicast Service (MBMS)

MBMS is a broadcasting technique for E-UTRAN to optimize the downlink radio resource usage in scenarios where a large amount of users is interested to receive the same content.

For MBMS, broadcasting services are principally covered by a large geographic area, consisting of one or more cells. Since all these cells distribute the same services, the spectral efficiency of MBMS transmission can be optimized by applying MBMS single frequency network (MBSFN) transmission, which means that identical data is transmitted on the same radio resources from each cell. The cells that offer the same set of MBMS services and the same scheduling of MBMS service sessions belong to one MBSFN area.

The MBMS control channel (MCCH) is needed for the User Equipment (UE) to obtain service specific information necessary for MBMS service reception, e.g. physical multicast channel (PMCH) configuration such as modulation and coding scheme, MBMS subframe allocation etc.

The MBMS can be provided on a dedicated carrier frequency or on a shared carrier frequency. In the former case all subframes can be used for MBMS signal transmission. In the latter scenario the MBMS is shared with unicast service in time division multiplex manner i.e. different subframes within a radio frame are used for MBMS and unicast services. The MBMS subframes are configurable by the network node. The information regarding which subframes are configured for MBMS in a cell is signaled by the network node. Examples of subframes which can be configured for MBMS i.e. as MBSFN subframes are subframes #1, 2, 3, 6, 7 and 8 for LTE FDD and subframes #3, 4, 7, 8 and 9 for LTE TDD. This means subframes #0 and #5 are always unicast subframes in both FDD and TDD. In addition in case of LTE FDD the subframes #4 and 9 and in case of LTE TDD subframes #1, 2 and 6 are also unicast subframes. The unicast subframes are used only for unicast services.

Configuration of MBMS Scheduling Information at eNodeB

The eNodeB (eNB) is configured with MBMS scheduling information by a network entity called a Multi-cell/multicast Coordination Entity (MCE). The MCE may be a separate network node or may reside in an eNB. The MCE and eNB communicate over a logical M2 interface.

The purpose of the MBMS Scheduling Information Procedure, as shown in FIG. 1, is to provide MCCH related information to the eNBs that take part in the transmission. The procedure uses non MBMS-Service-associated signalling. The MCE initiates the procedure by sending the MBMS SCHEDULING INFORMATION message to the eNB. This message provides MCCH related information to the eNB. The successful reception of this message is confirmed by the eNB in a response message. The MBMS SCHEDULING INFORMATION message includes information such as MBSFN subframe configuration, common subframe allocation period, MBSFN Area ID etc. The eNB uses this information for creating MBSFN subframe(s) and for creating the contents of the MCCH, which in turn is signaled to the UE over the radio interface.

Scheduling of MBMS to UE

The MCCH information is transmitted periodically, using a configurable repetition period. Scheduling information is not provided for MCCH i.e. both the time domain scheduling as well as the lower layer configuration are semi-statically configured, as defined within SystemInformationBlockType13 (SIB13). That is, the SIB13 includes the information required to acquire the MBMS control information associated with one or more MBSFN areas. The UE is also provided with SystemInformationBlockType15 (SIB15). The SIB15 includes the MBMS Service Area Identities (SAI) of the current and/or neighbouring carrier frequencies.

For MBMS user data, which is carried by the MTCH logical channel, E-UTRAN periodically provides MCH scheduling information (MSI) at lower layers (MAC). This MCH information only concerns the time domain scheduling i.e. the frequency domain scheduling and the lower layer configuration are semi-statically configured. The periodicity of the MSI is configurable and defined by the MCH scheduling period.

MBMS Related UE Measurements

The UE may perform one or more of these measurements on MBMS subframes which contain also PMCH data:

MBSFN Reference Signal Received Power(MBSFN RSRP)

MBSFN Reference signal received power (MBSFN RSRP), is defined as the linear average over the power contributions (in [W]) of the resource elements that carry MBSFN reference signals within the considered measurement frequency bandwidth. MBSFN Reference Signal Received Quality (MBSFN RSRQ)

MBSFN Reference Signal Received Quality (RSRQ) is defined as the ratio N×MBSFN RSRP/(MBSFN carrier RSSI), where N is the number of RBs of the MBSFN carrier RSSI measurement bandwidth. The measurements in the numerator and denominator shall be made over the same set of resource blocks.

MBSFN carrier RSSI comprises the linear average of the total received power (in [W]) observed only in OFDM symbols containing reference symbols for antenna port 4, in the measurement bandwidth, over N number of resource blocks by the UE from all sources, including co-channel serving and non-serving cells, adjacent channel interference, thermal noise etc.

Multicast Channel Block Error Rate (MCH BLER)

Multicast channel block error rate (MCH BLER) estimation can be based on evaluating the CRC of MCH transport blocks. The BLER can be computed over the measurement period as the ratio between the number of received MCH transport blocks resulting in a CRC error and the total number of received MCH transport blocks of an MCH. The MCH BLER estimation can only consider MCH transport blocks using the same MCS.

In conventional systems, the UE served by a cell on one carrier frequency (e.g., frequency f1) for unicast data may also intend to acquire MBMS service. However it is possible that the MBMS service is offered on another non-serving carrier frequency (e.g., frequency f2). In order to allow the UE to access MBMS the network node serving the UE has to perform handover to the frequency f2. Similarly in idle mode the UE itself can perform cell reselection to carrier f2 for accessing the MBMS. One problem with this solution is that the cell on the target carrier f2 may not be the best cell for receiving the unicast services. Therefore the unicast reception and/or transmission performance may be degraded. Another problem with this approach is that the number of handovers or cell reselection may increase which in turn may increase the probability of call dropping or paging loss.

In another conventional option, the UE interrupts the reception and transmission of the unicast service on carrier f1 while receiving the MBMS service on carrier f2. This will however cause severe degradation of unicast performance. This will also deteriorate mobility measurement performance of measurements done on unicast subframes on the serving carrier. This in turn will lead to mobility degradation e.g. delay in handover, call dropping, etc.

Yet another existing option is to implement two or more receivers where at least one can be solely used for MBMS reception on non-serving carrier frequency. For example according to the existing specification the UE is not required to interrupt serving cell for acquiring MBMS on inter-frequency. That is, the assumption is that UE that with at least dual receiver can access MBMS on non-serving carrier. This is however a limitation since firstly this will increase the cost, complexity and power consumption at the UE. Secondly the UE may use multiple receivers (aka multiple radio chains) for carrier aggregation of unicast data such as one receiver for receiving on PCell on f1 and another receiver for receiving on SCell on f3. However for accessing the MBMS on f2 such UE will have to either interrupt on at least one of the PCell and SCell. The other option could be that the UE does not use carrier aggregation and instead use the second radio chain for MBMS reception. This approach however will also degrade the performance of the unicast services and also deteriorate the mobility performance.

SUMMARY

The presently disclosed embodiments are directed to solving one or more of the problems presented in the prior art, as well as providing additional features that will become readily apparent by reference to the following description when taken in conjunction with the accompanying drawing.

An embodiment described herein is directed to a method, in a first network node configuring MBMS related information, for enabling MBMS transmission in at least one MBMSFN area. The method can include determining a first MBMS configuration comprising at least a first MBSFN subframe configuration for MBMS transmission on a first carrier frequency, and a second configuration comprising of at least a second blank or partly blank subframe configuration on a second carrier frequency, wherein at least one first MBSFN subframe at least partly overlaps in time with at least one second subframe. The method can further include configuring a second network node with the first MBMS configuration for MBMS signal transmission on the first carrier frequency; and configuring a third network node with the second configuration on the second carrier frequency.

Another embodiment described herein is directed to a method in a UE served by a second cell (cell2) belonging to a second carrier frequency (f2). The method can include determining a first MBMS configuration comprising at least a first MBSFN subframe configuration for MBMS transmission on a first carrier frequency (f1), and a second configuration comprising of at least a second blank or partly blank subframe configuration on the second carrier (f2); determining that at least one first MBSFN subframe at least partly overlaps in time with at least one second blank or partly blank subframe; and receiving MBMS signals on at least one first cell belonging to the first carrier frequency (f1) during the determined overlapped MBSFN subframe, while not interrupting reception and/or transmission of signals on any unicast subframe on the second cell of the second carrier frequency.

Moreover, yet other embodiments described herein are directed to network node(s) and a UE configured to perform the methods indicated above.

Yet other embodiments described herein are directed to non-transitory computer-readable computer media storing instructions thereon for, when executed by a processor, performing the methods indicated above.

As a result of the forgoing exemplary embodiments, a UE could be enabled to receive MBMS signals on non-serving carrier without interrupting the serving cell. Moreover, the UE is not required to have multiple receivers for receiving MBMS signals from the non-serving carrier frequencies. This reduces UE complexity and saves UE battery life since simultaneous operation on serving carrier and non-serving carrier(s) carrying MBMS signals will increase UE power consumption. The performance of the radio measurements performed on the unicast subframes on the serving carrier (e.g. cell identification, RSRP, RSRQ, etc.) may not be degraded, which avoids call dropping, delay in handover, etc.

Other features and advantages will become obvious to one of ordinary skill in the art in light of the following detailed description and drawings.

DESCRIPTION OF EXEMPLARY EMBODIMENTS

Figure 1:
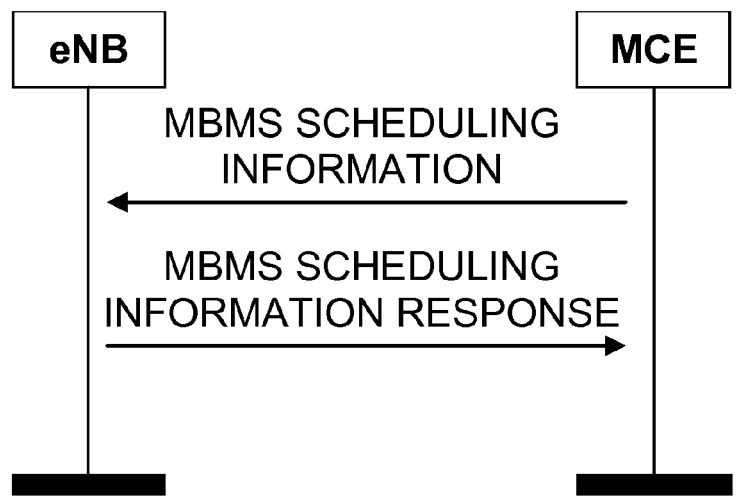
FIG. 1 is an exemplary MBMS Scheduling Information procedure, according to an exemplary embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device or apparatus (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform the functions described herein.

The following terminologies are described in various embodiments:

Network node: In some embodiments a more general term "network node" is used and it can correspond to any type of radio network node or any network node, which communicates with a UE and/or with another network node. Examples of network nodes are Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

User equipment: In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc.

It should be noted that although terminology from 3GPP LTE has been used in this disclosure to exemplify the embodiments described herein, this should not be seen as limiting the scope of the invention to only the aforementioned system. Other wireless systems, including WCDMA, HSPPA, WiMax, WiFi, WLAN, and GSM/GERAN, may also benefit from exploiting the scope of this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

The embodiments described herein after can be implemented in a network node and a UE. Some embodiments are described for specific deployment scenario such as LTE heterogeneous network deployment. However these embodiments can be applied and implemented in nodes (UE and network node) of any type of radio access technology and also in any type of network deployment scenario. For example the embodiments can also be applied in homogeneous network deployment where all network nodes are of the same base station power class e.g. all are high power node (HPN) or all are low power node (LPN). In a heterogeneous network deployment the network nodes consist of mixture of HPN and LPN. Furthermore the embodiments are also applicable to heterogeneous or homogenous network deployment based on other technologies such as WCMDA/HSPA, GSM/GERAN/EDGE, CDMA2000/HRPD, WLAN or similar wireless communication technologies.

Figure 2:
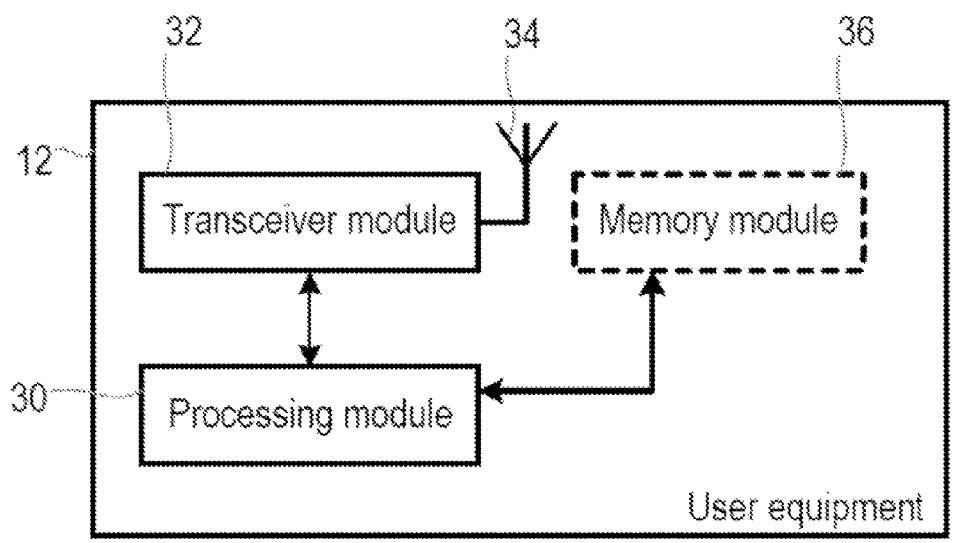
FIG. 2 is an exemplary block diagram of a user equipment (UE), according to an exemplary embodiment.

FIG. 2 is a block diagram of a UE 12, according to one exemplary embodiment, that can be used in one or more of the non-limiting example embodiments described. The UE 12 may in some embodiments be a mobile device that is configured for machine-to-machine (M2M) or machine-type communication (MTC). The UE 12 comprises a processing module 30 that controls the operation of the UE 12. The processing module 30 is connected to a receiver or transceiver module 32 with associated antenna(s) 34 which are used to receive signals from or both transmit signals to and receive signals from a base station 10 in the network 2. To make use of discontinuous reception (DRX), the processing module 30 can be configured to deactivate the receiver or transceiver module 32 for specified lengths of time. The user equipment 12 also comprises a memory module 36 that is connected to the processing module 30 and that stores program and other information and data required for the operation of the UE 12. In some embodiments, the UE 12 may optionally comprise a satellite positioning system (e.g. GPS) receiver module 38 that can be used to determine the position and speed of movement of the UE 12.

Figure 3:
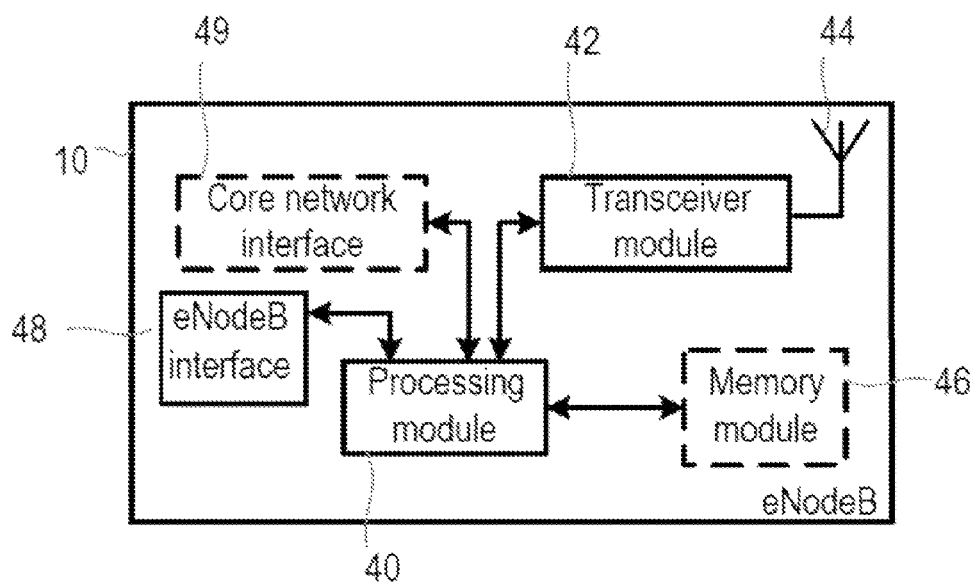
FIG. 3 is an exemplary block diagram of a base station, according to an exemplary embodiment.

FIG. 3 shows a base station 10 (for example a NodeB or an eNodeB) that can be used in example embodiments described. It will be appreciated that although a macro eNB will not in practice be identical in size and structure to a micro eNB, for the purposes of illustration, the base stations 10 are assumed to include similar components. Thus, the base station 10 comprises a processing module 40 that controls the operation of the base station 10. The processing module 40 is connected to a transceiver module 42 with associated antenna(s) 44 which are used to transmit signals to, and receive signals from, UEs 12 in the network 2. The base station 10 also comprises a memory module 46 that is connected to the processing module 40 and that stores program and other information and data required for the operation of the base station 10. The base station 10 also includes components and/or circuitry 48 for allowing the base station 10 to exchange information with other base stations 10 (for example via an X2 interface) and components and/or circuitry 49 for allowing the base station 10 to exchange information with nodes in the core network 4 (for example via the S1 interface). It will be appreciated that base stations for use in other types of network (e.g. UTRAN or WCDMA RAN) will include similar components to those shown in FIG. 4 and appropriate interface circuitry 48, 49 for enabling communications with the other network nodes in those types of networks (e.g. other base stations, mobility management nodes and/or nodes in the core network).

The described embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The embodiments are described for MBMS transmission LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

In some embodiments the term subframe, MBMS subframe or MBSFN subframe are interchangeably used but they all bear the same meaning. However the embodiments are not limited to MBMS on a subframe level; rather they apply to any duration or time period over which MBMS can be transmitted in the current or in future communication system e.g. frame, time slot, symbols etc. Furthermore, the embodiments described herein are not limited to MBMS particularly but may be applied in a similar way to any multicast/broadcast type of transmissions or service.

Description of a Scenario with MBMS Transmission

An exemplary scenario comprises a signal transmission on at least two carrier frequencies, a first carrier frequency (f1) and a second carrier frequency (f2). One or more cells may operate on carrier frequency f1 and also one or more cells may operate on carrier frequency f2. At least one of the carrier frequencies is used for MBMS transmission. For simplicity it is assumed in this disclosure that MBMS (i.e. PMCH) is transmitted on at least one MBSFN subframe on at least carrier frequency f1. The PMCH is a physical MBMS channel carrying MBMS transport channel called MCH. The MCH contains MTCH and MCCH which carry MBMS traffic (data) and MBMS related control/system information respectively. In some embodiment MBMS may also be transmitted on the second carrier, f2. The scenario can be generalized for any number of carriers (e.g. f1, f2, . . . , $f_N$) where MBMS is to be transmitted on one or more carriers.

The signals on carrier f1 and carrier f2 are transmitted by at least one second network node and at least one third network node respectively, in one exemplary embodiment. In some embodiments the second and the third network nodes may be the same; for example when f1 and f2 are operated by the same network node. Examples of second network node and at least one third network node are eNode B, base station, etc. The group of cells sending, and contributing with, same MBMS information to a UE 12 constitutes a MBSFN area.

A first network node configures a network node, which is configured to transmit MBMS, with MBMS scheduling information (e.g. MCCH). For example the first network node configures at least one first network node with MBMS related information (e.g. MBMS scheduling information) for assisting the first network node enabling it to transmit MBMS information.

In some embodiments a first network node may be a node such as MCE, MME, some centralized and/or coordinating network node, etc. In some embodiments the first network node and at least one of the second and the third network nodes may be the same. In this case each network node may itself configure MBMS related information for MBMS transmission, e.g. based on inter-network node signaling, pre-defined or stored information etc.

In some embodiments, at least one of the first, second and third network nodes may comprise test equipment or test system (e.g. system simulator) that mimics or emulates a node for testing a procedure implemented in a network node.

Exemplary Method in a Network Node of Determining and Configuring Other Network Nodes with at Least Partially Aligned First and Second Configurations One exemplary embodiment comprises a method which may be implemented e.g. in a first network. The method can comprise any of the following steps in various combinations performed by the first network node:

a. Determining that MBMS is being transmitted or is expected to be transmitted on at least one carrier frequency in at least one cell in a coverage area, e.g. on carrier f1.

b. Determining that there is at least one more carrier frequency (e.g. f2) being used or expected to be used for transmitting signals (e.g. unicast transmission) in the same coverage area as that of f1 or a carrier (i.e. f2) whose coverage at least partially overlaps with that of the carrier on which MBMS is to be transmitted (i.e. f1).

c. Determining a first MBMS configuration for MBMS transmission on the first carrier frequency and a second configuration on the second carrier frequency to facilitate receptions of MBMS on the first carrier frequency, wherein the first and the second configurations are related by a relation (discussed in greater detail below).

d. The first configuration can be configured for MBMS transmission and the second configuration comprises blank or partially blank time-frequency resources, and at least one subframe on f1 is used in the first configuration and at least one subframe on f2 is used in the second configuration overlap in time, and f1 is a non-serving carrier frequency and f2 is a serving carrier frequency (e.g., PCC or SCC or the serving cell in a non-CA mode).

e. Some non-limiting examples of blank or partially blank time-frequency resources comprise subframes without DL unicast data, subframes not used by the UE for receiving any DL signals, UL subframes or subframes used for transmissions by the UE, MBSFN subframes with MCH, MBSFN subframes without MCH, MBSFN subframes associated with another MBMS area and/or service, ABS subframes, DL subframes with no unicast data scheduled, empty subframes with no DL or UL unicast/multicast/broadcast transmissions, etc.).

f. Configuring the first network node and the second network node with the determined first configuration and the determined second configuration for enabling reception of MBMS at least on f1.

The steps above may be preceded by obtaining information on whether one or more UEs 12 served on f2 are capable of simultaneously receiving MBMS on f1, e.g., based on UE 12 capability. In one example, a CA-capable UE 12 may be capable of receiving simultaneously signals and channels on both f1 and f2. Such information may be obtained through the capability signaling received from UE 12 or another node or by autonomous determining (e.g., based on measurements, history information, etc.).

The steps above may be preceded by obtaining information about the current, recent or typical serving cell or serving carrier configuration of one or more UEs 12. Such information may be obtained through the configuration signaling received from UE 12 or another node or by autonomous determining (e.g., based on measurements, history information, etc.). Of course various combinations of the foregoing steps, in various orders, could be implemented within the scope of the disclosure.

In one embodiment, the first and the second configurations herein comprise at least a first subframe configuration (e.g., MBSFN configuration or MBMS configuration) and a second subframe configuration, respectively. In one example, the second subframe configuration further comprises an MBSFN subframe configuration or MBMS configuration, wherein the first MBSFN subframe configuration and the second MBSFN subframe configuration are used for MBMS related signal transmissions on the first carrier frequency and on the second carrier frequency respectively. The MBSFN subframe configuration informs which subframes are to be configured for MBMS transmission (e.g. subframes #7 and 8). The number of subframes for at least the first MBMS configuration may be decided based on amount of MBMS information to be transmitted on certain carrier. The MBMS configuration may also contain information such as common subframe allocation period, MBSFN area ID etc.

One aspect of this embodiment is that the first network also creates the second subframe configuration which includes at least one subframe that overlaps with at least one MBSFN subframe in the first MBMS configuration. This relation between the two configurations allows one or more UEs 12:

To be served by at least one cell (e.g. PCell) on the second carrier (f2);

To receive MBMS signals on the first carrier without interrupting the serving cell on f2 i.e. receive the unicast traffic on f2; and/or To perform measurements on the cells on f2 without degrading the measurement performance.

The above objectives can be achieved because the UE 12 causes interruption on its serving carrier f2 during the MBSFN subframe(s) for receiving MBMS on the f1. In other words the above objectives are realized by UE 12 receiving MBMS only in MBSFN subframe(s) on f1 which overlap with MBSFN subframe(s) on its serving carrier (f2).

If no MBMS transmission is required on the second carrier as determined by the first network node then the corresponding MBSFN subframe(s) can include only the MBSFN reference signal (MBSFN RS) but no PMCH (i.e. no MBMS related data, and/or blank MBMS or blank MBSFN). MBSFN RS can be transmitted in symbol #0 of each subframe configured as a MBSFN subframe, according to an exemplary embodiment.

If MBMS transmission is also required on the second carrier as determined by the first network node then the corresponding MBSFN subframe(s) can include MBSFN RS as well as PMCH.

Depending upon the amount of required MBMS transmission on the second carrier, it is also possible that a certain number of MBSFN subframe(s) include PMCH and remaining ones do not include PMCH; however, all MBSFN subframes can include MBSFN RS.

The first network node may also determine to what extent the two carriers are time-aligned. This information is used by the first network node to decide which subframe numbers to be configured as MBSFN subframes on the two carriers. The time-alignment between carriers herein may be referred to, in one example, as frame alignment, i.e. the respective frames start around the same time within a frame time alignment error (e.g. within 3 μs). The time-alignment between carriers herein may also refer to subframe alignment, i.e. the starting times of their respective frames are shifted by one or an integer multiple of subframes within a subframe time alignment error (e.g. within 3 μs). The determination regarding the extent to which carriers are time-aligned can be based on information received from first and second network nodes about their frame start timings, from another network node (e.g. O&M, OSS etc) or based on stored or historical information available in the first network node, etc. The determination may also be implicit based on the existing requirements, e.g., it is known that TDD cells have to be synchronized as well as cells/carriers configured for CA.

In one exemplary embodiment the first network node configures the same number of MBSFN subframes on both carrier frequencies. If the frames of the two carriers are time aligned then the MBSFN subframe numbers on both carriers will also be identical. Otherwise all MBSFN subframe numbers on both carriers may not be the same. These two cases are illustrated by examples for MBMS transmission in LTE FDD in FIGS. 4 and 5 and described below. However, it would be appreciated by one of ordinary skill in the art that a similar explanation applies to LTE TDD.

Figure 4:
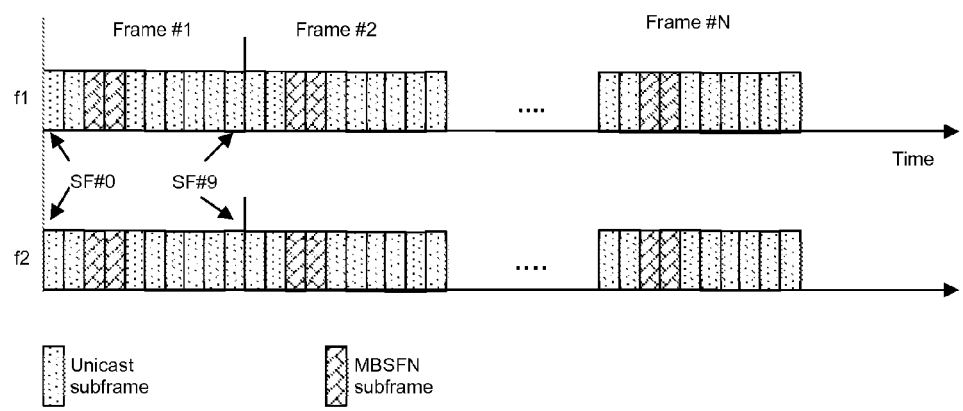
FIG. 4 is a depiction of subframes configured as MBSFN subframes on two carriers whose frames are time-aligned, according to an exemplary embodiment.
Figure 5:
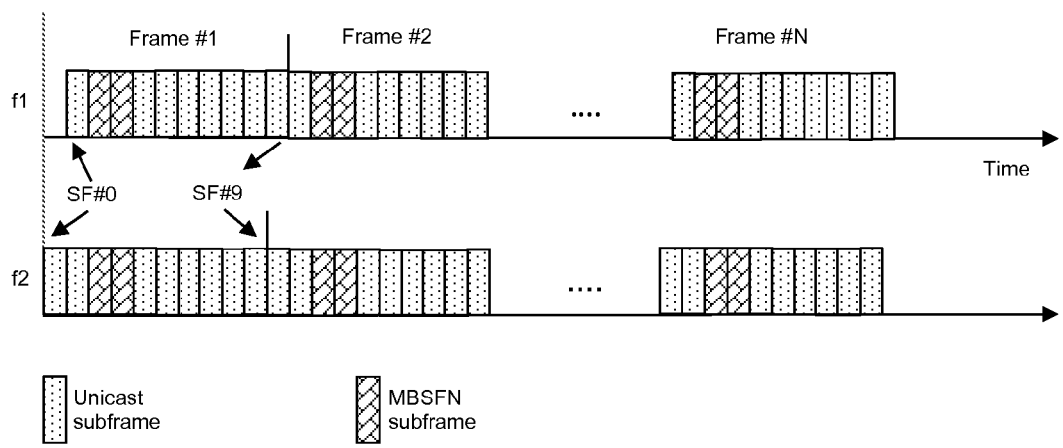
FIG. 5 is a depiction of frame misaligned carriers that are shifted by one subframe, according to an exemplary embodiment.

For instance FIG. 4 shows that the subframe (SF) numbers #2 and #3 are configured as MBSFN subframes on both carriers whose frames are time-aligned. FIG. 5 shows the case of frame misaligned carriers that are shifted by one subframe. Therefore in this case the subframe (SF) numbers #1 and #2 are configured as MBSFN subframes on the second carrier (f2) but subframe (SF) numbers #2 and #3 are configured as MBSFN subframes on the first carrier (f1). This ensures that the MBSFN subframes on both carriers overlap in time even though their frames are not time-aligned.

It should be noted that embodiments in this disclosure are applicable regardless of whether the carriers (e.g. f1 and f2) are frame aligned or subframe aligned or not.

In yet another aspect of this embodiment, if the carriers are neither frame-aligned nor subframe aligned within the time alignment error then the first node may frame-align or subframe-align the carriers before or while configuring them with their respective MBMS configurations. The time alignment can be initiated by the first network node by sending a message to the second and the third network nodes requesting them to adjust the transmit timing of their frames or subframes by indicated amount to achieve the desired time alignment.

After the MBMS configuration is done the second and the third network nodes start transmitting the MBMS related signals (e.g. PMCH, MBSFN RS, etc.) according to the MBMS configuration done by the first network node unless a new or modified MBMS configuration is received, for example.

Figure 6:
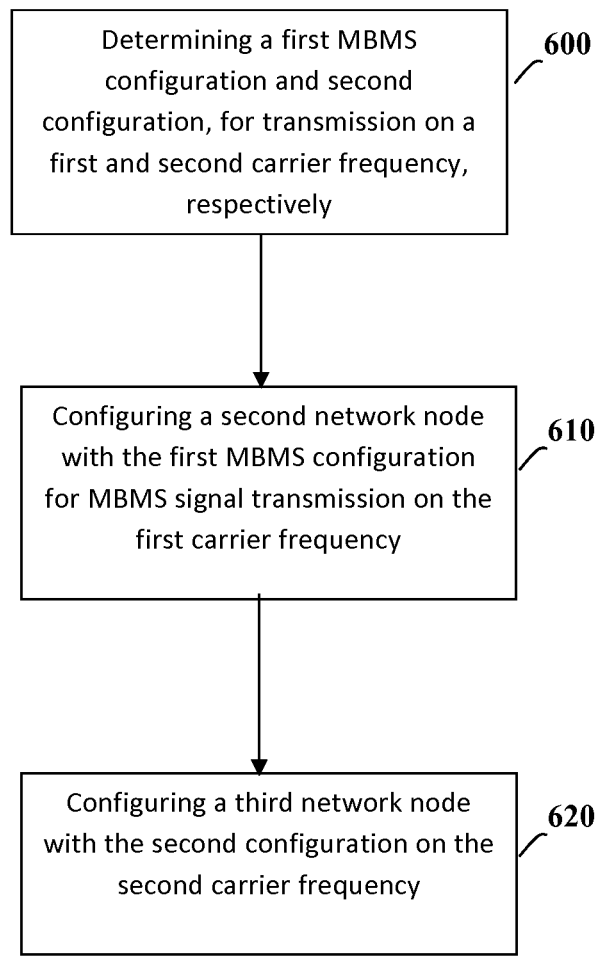
FIG. 6 is a flow diagram illustrating an exemplary method of enabling MBMS transmission in at least one MBSFN area, according to an exemplary embodiment.

As depicted in the flow diagram of FIG. 6, embodiments described herein provide a method, in a first network node configuring MBMS related information, for enabling MBMS transmission in at least one MBMSFN area, according to one example. The method can include determining a first MBMS configuration comprising at least a first MBSFN subframe configuration for MBMS transmission on a first carrier frequency, and a second configuration comprising of at least a second blank or partly blank subframe configuration on a second carrier frequency (step 600).

From step 600, the process can move to step 610, where a second network node is configured with the first MBMS configuration for MBMS signal transmission on the first carrier frequency.

From step 610, the process can move to step 620, where a third network node is configured with the second configuration on the second carrier frequency.

Of course, as described above, one of ordinary skill in the art would realize that the exemplary process can be performed at various types of network nodes, such as a base station 10 or other network entity. Moreover, various functions may be performed at distinct nodes from each other.

Exemplary Method in a UE of Receiving MBMS Without Interrupting Unicast Subframes This exemplary embodiment discloses rules which may be used by the UE 12 (separately or in any combination) to avoid interruption on unicast subframes of its serving cell on the serving carrier (e.g. second carrier, f2) while receiving the MBMS signals on at least another carrier frequency (e.g. first carrier, f1).

The rules can be pre-defined in the standard, to be complied with by the UE 12. Examples of one or more rules are:

A UE 12 shall not cause any interruption on receiving its unicast subframes on a serving cell when the UE receives MBMS on one or more inter-frequency carriers (aka MBMS carriers i.e. carriers transmitting MBMS signals on a carrier frequency different from the serving carrier frequency). Receiving MBMS may comprise receiving MBMS data and/or performing MBMS measurements on MBMS-related signals (e.g., MBSFN RS).

In a further embodiment, the rule may apply for UE 12 with a specific receiver configuration, e.g., for UE 12 with a single receiver, UE 12 with multiple receivers but on a single chip, or UE 12 not capable of CA.

A UE 12 shall not cause interruption in receiving its unicast subframes on the serving cell when receiving MBMS on one or more inter-frequency carriers.

A UE 12 incapable of simultaneously receiving the set of MBMS frequencies of interest shall not interrupt a serving cell when receiving MBMS one or more inter-frequency carriers provided the first and the second configurations (as defined in other sections) on the serving cell and on one or more inter-frequency carriers are related by a relation. Examples of such a relation can include:

at least one MBMS subframe configured on serving cell and at least one blank or partially blank subframes configured on any of the frequency for receiving MBMS overlap in time;

at least a certain number of MBMS subframes (e.g. 2) configured on serving cell and any of the frequency for receiving MBMS overlap in time;

at least certain number of MBMS subframes (e.g. 2) configured on serving cell and any of the frequencies for receiving MBMS overlap in time and that the serving carrier frequency and the frequency for receiving MBMS are frame-aligned or subframe aligned;

A UE 12 shall not interrupt serving cell when performing one or more MBMS measurements (e.g. MBSFN RSRP, MBSFN RSRQ, MCRH BLER etc) on one or more inter-frequency carriers (or MBMS carriers) provided the MBMS configurations on the serving cell and on one or more inter-frequency carriers are related by a relation. Examples of such a relation are the same as provided above.

A UE 12 not capable of simultaneously receiving the set of MBMS frequencies of interest shall not interrupt the serving cell when performing one or more MBMS measurements (e.g. MBSFN RSRP, MBSFN RSRQ, MCRH BLER etc) on one or more inter-frequency carriers (or MBMS carriers) provided the MBMS configurations on the serving cell and on one or more inter-frequency carriers are related by a relation. Examples of such a relation are the same as provided above.

A UE 12 not capable of simultaneously receiving the serving carrier and one or more MBMS carrier frequencies shall not interrupt the serving cell when performing one or more MBMS measurements (e.g. MBSFN RSRP, MBSFN RSRQ, MCRH BLER etc) on one or more inter-frequency carriers (or MBMS carriers) provided the MBMS configurations on the serving cell and on one or more inter-frequency carriers are related by a relation. Examples of such a relation are the same as provided above.

In the above, the serving cell may be a PCell or SCell or the serving cell for a UE 12 not configured with CA. The serving carrier may be a PCC, SCC or the carrier with the serving cell for a UE 12 not configured with CA.

The above one or more rules may require the UE 12 served by the second carrier (f2) to perform one or more of the following steps:

Determine whether the UE 12 has the capability of simultaneously receiving the serving carrier (f2) and one or more MBMS carrier frequencies;

Determine that MBMS signals are to be received by the UE 12 on one or more MBMS carrier frequencies (e.g. first carrier, f1). The MBMS reception can be for receiving MBMS data on PMCH and/or for performing MBMS related measurements. The determination can be based on the request received from higher layers such as by the application program, operating system, etc.

Determine whether there is at least one second subframe comprised in the second configuration on the serving carrier and one first subframe comprised in the first configuration on the at least one MBSFN carrier which overlap in time;

It is noted that "overlap" may mean be fully or partly aligned in time, overlap at least partly, mostly overlap (e.g., by half subframe or more), etc.

Receiving the MBMS signals transmitted during the determined first subframe operating on at least one MBMS carrier (i.e. non serving carrier) while not causing interruption on serving cell even if the UE 12 cannot simultaneously receive serving carrier (f1) and MBMS carrier (f2), provided that the at least the first subframe on f1 overlap in time with the determined at least second subframe on f2.

In order to ensure that the UE 12 is able to follow and apply the above pre-defined rules, the network node can ensure that the first and the second configurations on f1 and f2 are related by the relation (as described in the above pre-defined rules). In other words, the pre-defined rules can also require the network node to configure MBMS on different carriers according to a certain relation.

Figure 7:
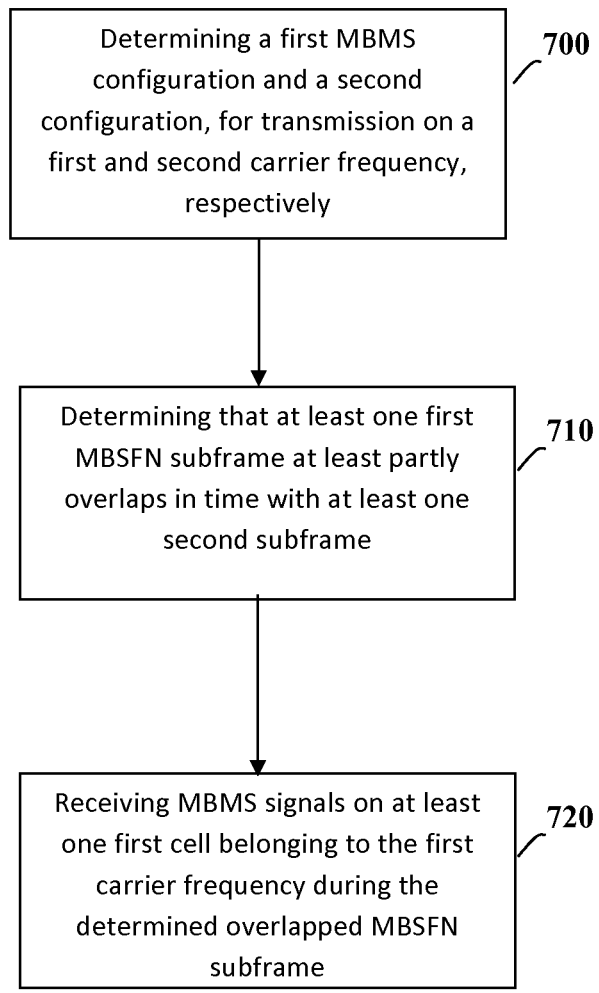
FIG. 7 is a flow diagram illustrating an exemplary method of receiving MBMS signals in a UE served by a second cell (cell2) belonging to a second carrier frequency (f2), according to an exemplary embodiment.

FIG. 7 is a flow diagram illustrating an exemplary method of receiving MBMS signals in a UE served by a second cell (cell2) belonging to a second carrier frequency (f2), according to an exemplary embodiment. Referring to FIG. 7, at operation 700 a first MBMS configuration is determined comprising at least a first MBSFN subframe configuration for MBMS transmission on a first carrier frequency (f1), and a second configuration comprising of at least a second blank or partly blank subframe configuration on the second carrier (f2).

From operation 700, the process proceeds to operation 710 where it is determined whether at least one first MBSFN subframe at least partly overlaps in time with at least one second blank or partly blank subframe.

From operation 710, the process proceeds to operation 720 where MBMS signals are received by UE 12 on at least one first cell belonging to the first carrier frequency (f1) during the determined overlapped MBSFN subframe, while not interrupting reception and/or transmission of signals on any unicast subframe on the second cell of the second carrier frequency.

As a result of the forgoing exemplary embodiments, a UE 12 could be enabled to receive MBMS signals on non-serving carrier without interrupting the serving cell. More- over, the UE 12 is not required to have multiple receivers for receiving MBMS signals from the non-serving carrier frequencies. This reduces UE 12 complexity and saves UE 12 battery life since simultaneous operation on serving carrier and non-serving carrier(s) carrying MBMS signals will increase UE 12 power consumption. The performance of the radio measurements performed on the unicast subframes on the serving carrier (e.g. cell identification, RSRP, RSRQ etc.) may not be degraded, which avoids call dropping, delay in handover, etc.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the disclosed features have been described in terms of several embodiments, those skilled in the art will recognize that the invention is not limited to the embodiments described, can be practiced with modification and alteration within the spirit and scope of the appended claims. The description is thus to be regarded as illustrative instead of limiting.

ABBREVIATIONS

MBMS
Multimedia Broadcast Multicast Service
MB SFN
Multimedia Broadcast multicast service
Single Frequency Network
MDT
Minimization of Drive Tests
MIB
Master Information Block
MCE
Multi-cell/multicast Coordination Entity
MME
Mobility Management Entity
UE
User Equipment
BS
Base Station
D2D
Device-to-Device
M2M
Machine-To-Machine
MTC
Machine-Type Communication
eNB
Evolved Node B, base station
E-UTRAN
Evolved universal terrestrial radio access network
E-UTRA
Evolved universal terrestrial radio access
E-UTRA FDD
E-UTRA frequency division duplex
E-UTRA TDD
E-UTRA time division duplex
LTE
Long term evolution
RAT
Radio Access Technology
RRC
Radio resource control
TDD
Time division duplex RNC
Radio Network Controller
BSC
Base station Controller
HSPA
High Speed Packet Access
GSM
Global system for mobile communication
UTRA
Universal terrestrial radio access
UTRA FDD
UTRA frequency division duplex
UTRA TDD
UTRA time division duplex
WLAN
Wireless Local Area Network
GERAN
GSM EDGE Radio Access Network
EDGE
Enhanced Data rates for GSM Evolution
CDMA2000
Code division multiple access 2000
HRPD
High rate packet data
DL
Downlink
UL
Uplink

What is claimed is:

1. A method in a first network node for enabling multimedia broadcast multicast service (MBMS) transmission in at least one multimedia broadcast multicast service single frequency network (MBSFN) area, the method comprising:
determining a first MBMS configuration comprising at least a first MBSFN subframe configuration for MBMS transmission on a first carrier frequency, and a second configuration comprising of at least a second blank or partly blank subframe configuration on a second carrier frequency, wherein at least one first MBSFN subframe at least partly overlaps in time with at least one second subframe;
configuring a second network node with the first MBMS configuration for MBMS signal transmission on the first carrier frequency; and
configuring a third network node with the second configuration on the second carrier frequency, wherein
the subframes of the first and the second carrier frequencies are time aligned and radio frames of the first and second carrier frequencies are misaligned by at least one subframe.

2. The method of claim 1, wherein the second configuration further comprises a second MBMS configuration, and the second blank or partly blank subframe configuration further comprises a second MBSFN subframe configuration on the second carrier.

3. The method of claim 1, wherein the first network node is any of: Multi-cell/multicast Coordination Entity (MCE), a core network node or a mobile management entity (MME).

4. The method of claim 1, wherein either the second or third network nodes are either an eNodeB or a base station.

5. The method of claim 1, wherein first and second MBSFN subframes have different subframe numbers.

6. The method of claim 1, wherein at least one subframe within the second MBSFN subframe configuration does not include a physical multicast channel (PMCH) transmission.

7. The method of claim 6, wherein the at least one subframe is the second MBSFN subframe.

8. A method in a UE served by a second cell (cell2) belonging to a second carrier frequency (f2), the method comprising:
determining a first MBMS configuration comprising at least a first MBSFN subframe configuration for MBMS transmission on a first carrier frequency (f1), and a second configuration comprising of at least a second blank or partly blank subframe configuration on the second carrier (f2);
determining that at least one first MBSFN subframe at least partly overlaps in time with at least one second blank or partly blank subframe; and
receiving MBMS signals on at least one first cell belonging to the first carrier frequency (f1) during the determined overlapped MBSFN subframe, while not interrupting reception and/or transmission of signals on any unicast subframe on the second cell of the second carrier frequency, wherein
the subframes of the first and the second carrier frequencies are time aligned and radio frames of the first and second carrier frequencies are misaligned by at least one subframe.

9. The method of claim 8, wherein the second configuration further comprises a second MBMS configuration, and the second blank or partly blank subframe configuration further comprises a second MBSFN subframe configuration on the second carrier.

10. The method according to claim 8, wherein receiving the MBMS signals on at least one first cell of the f1 comprises one or more of the following: receiving MBMS data which may comprise signals transmitted on PMCH; receiving MBSFN RS; performing one or more of the following MBSFN measurements: MBSFN RSRP; MBSFN RSRQ; and/or Multicast Channel Block Error Rate (MCH BLER).

11. The method according to claim 8, wherein the first carrier frequency (f1) is a non-serving carrier and the second carrier frequency (f2) is a serving carrier of the UE.

12. The method of claim 8, wherein at least one subframe within the second MBSFN subframe configuration does not include a physical multicast channel (PMCH) transmission.

13. The method of claim 12, wherein the at least one subframe is the second MBSFN subframe.

14. The method of claim 13, wherein the second MBSFN subframe is the blank subframe, wherein no MBMS data is transmitted in the blank subframe.

15. The method of claim 8, wherein the UE is not capable of simultaneously receiving the MBMS data on at least one first cell of the f1 and the unicast data on at least one second cell of the f2.

16. The method of claim 8, wherein the UE is not capable of simultaneous receiving signals on the first and the second carriers.

17. A non-transitory computer readable medium storing instructions thereon for performing method in a first network node for enabling multimedia broadcast multicast service (MBMS) transmission in at least one multimedia broadcast multicast service single frequency network (MBSFN) area, the method comprising:
determining a first MBMS configuration comprising at least a first MBSFN subframe configuration for MBMS transmission on a first carrier frequency, and a second configuration comprising of at least a second blank or partly blank subframe configuration on a second carrier frequency, wherein at least one first MBSFN subframe at least partly overlaps in time with at least one second subframe;

configuring a second network node with the first MBMS configuration for MBMS signal transmission on the first carrier frequency; and configuring a third network node with the second configuration on the second carrier frequency, wherein
the subframes of the first and the second carrier frequencies are time aligned and radio frames of the first and second carrier frequencies are misaligned by at least one subframe.

18. A non-transitory computer readable medium storing instructions thereon for performing a method in a UE served by a second cell (cell2) belonging to a second carrier frequency (f2), the method comprising:

determining a first MBMS configuration comprising at least a first MBSFN subframe configuration for MBMS transmission on a first carrier frequency (f1), and a second configuration comprising of at least a second blank or partly blank subframe configuration on the second carrier (f2);

determining that at least one first MBSFN subframe at least partly overlaps in time with at least one second blank or partly blank subframe; and receiving MBMS signals on at least one first cell belonging to the first carrier frequency (f1) during the determined overlapped MBSFN subframe, while not interrupting reception and/or transmission of signals on any unicast subframe on the second cell of the second carrier frequency, wherein
the subframes of the first and the second carrier frequencies are time aligned and radio frames of the first and second carrier frequencies are misaligned by at least one subframe.

* * * * *